(12) United States Patent
Umbehocker et al.

(10) Patent No.: US 7,818,515 B1
(45) Date of Patent: Oct. 19, 2010

(54) SYSTEM AND METHOD FOR ENFORCING DEVICE GROUPING RULES FOR STORAGE VIRTUALIZATION

(75) Inventors: Steven Umbehocker, Mercer Island, WA (US); Rasesh Kelkar, Pune (IN); Swanand Vaidya, Pune (IN)

(73) Assignee: Symantec Operating Corporation, Mountain View, CA (US)

(*) Notice: Subject to any disclaimer, the term of this patent is extended or adjusted under 35 U.S.C. 154(b) by 936 days.

(21) Appl. No.: 10/915,136

(22) Filed: Aug. 10, 2004

(51) Int. Cl.
*G06F 13/00* (2006.01)

(52) U.S. Cl. .................. 711/154; 711/114; 711/166; 713/100

(58) Field of Classification Search ............ 711/203, 711/154, 114, 166; 713/100
See application file for complete search history.

(56) References Cited

U.S. PATENT DOCUMENTS

| | | | |
|---|---|---|---|
| 5,765,206 A * | 6/1998 | Hohensee et al. ........... 711/203 |
| 6,145,067 A | 11/2000 | Kuwata | |
| 6,173,413 B1 * | 1/2001 | Slaughter et al. ............ 714/6 |
| 6,728,832 B2 | 4/2004 | Yamamoto | |
| 6,810,491 B1 | 10/2004 | Yamamoto et al. | |
| 2004/0030822 A1 * | 2/2004 | Rajan et al. ................. 711/4 |
| 2005/0120174 A1 * | 6/2005 | Uratani et al. .............. 711/114 |
| 2005/0267986 A1 * | 12/2005 | Murakami et al. .......... 709/238 |
| 2006/0195676 A1 * | 8/2006 | Honda et al. ............... 711/202 |

\* cited by examiner

*Primary Examiner*—Yong Choe
(74) *Attorney, Agent, or Firm*—Meyertons, Hood, Kivlin, Kowert & Goetzel, P.C.; B. Noel Kivlin

(57) ABSTRACT

A system includes one or more storage devices and virtualization software configured to aggregate storage in the one or more storage devices into a virtual storage device accessible to a storage consumer. The virtualization software may include a group validation layer comprising a device-independent interface configured to validate a proposed group configuration operation on the one or more storage devices. The device-independent interface may be used to verify that the proposed configuration operation would, if completed, result in a configuration capable of supporting a desired virtualization functionality. The device-independent interface may allow an application to manage the one or more devices as a unit known as a virtual device group.

24 Claims, 11 Drawing Sheets

SYSTEM AND METHOD FOR ENFORCING DEVICE GROUPING RULES FOR STORAGE VIRTUALIZATION

BACKGROUND OF THE INVENTION

1. Field of the Invention

This invention relates to computer systems, and more particularly, to device group management within storage virtualization environments.

2. Description of the Related Art

Many business organizations and governmental entities rely upon applications that access large amounts of data, often exceeding a terabyte or more of data, for mission-critical applications. Often such data is stored on many different storage devices, which may be centrally located or distributed throughout an enterprise. Such storage devices may be heterogeneous in nature, including many different types of devices with varying functional and performance specifications from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity.

Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

In such storage environments, a set of storage devices may be aggregated as a virtual device group and managed as a unit in order to support desired functionality. For example, a virtual device group may be exported as a unit from one storage environment, and imported at another. Storage devices aggregated into a virtual device group may need to conform to a set of group membership requirements, where the set of requirements may vary with the specific functionality desired. For example, all the storage devices constituting a virtual device group may be required to provide a specified minimum level of performance, and/or to support a specific operation such as the ability to create a hardware snapshot. If a virtual device group is modified in a manner incompatible with the group membership requirements (for example, by adding a device that does not support a particular function supported by other devices already included within the virtual device group), data loss may occur, and/or elements of metadata used to manage the storage environment may become unavailable or corrupted. In a storage environment where storage devices with different technical specifications from multiple vendors may be used, the use of vendor-specific and/or device-specific interfaces to verify that group membership requirements are met by each device may result in inefficiencies (e.g., duplication of code) and in error-prone storage management software.

SUMMARY OF THE INVENTION

Various embodiments of systems and methods for enforcing device grouping rules for storage virtualization are disclosed. According to a first embodiment, a system may include one or more storage devices and virtualization software configured to aggregate storage in the one or more storage devices into a virtual storage device accessible to a storage consumer. The virtualization software may include a group validation layer comprising a device-independent interface configured to validate a proposed group configuration operation on the one or more storage devices. That is, the device-independent interface may be used to verify that the proposed configuration operation would, if completed, result in a configuration capable of supporting a desired virtualization functionality. The device-independent interface may allow an application to manage the one or more devices as a unit known as a virtual device group.

Numerous proposed group configuration operations may be validated using the device-independent interface in different embodiments. For example, in some embodiments, a proposed operation that may result in a change in the membership of the virtual device group may be validated, such as an operation to add a storage device to the virtual device group, an operation to remove a device from the virtual device group, or an operation to remove all devices from the virtual device group and thereby make the virtual device group unavailable. In other embodiments, other proposed group configuration operations may be validated, such as a frozen image operation, an operation to deport (i.e., prevent further access to) the virtual device group from a device group provider (such as a volume manager), or an operation to import a virtual device group to a device group provider.

In one specific embodiment, the system may also include a plurality of nodes coupled to a network to form a cluster. A first subset of the one or more storage devices may be attached to a first node, and a second subset of the one or more storage devices may be attached to a second node. The virtual device group and the virtual storage device may be accessible from any node in the cluster.

In one contemplated embodiment, a system may include one or more storage devices and virtualization software configured to aggregate storage in the one or more storage devices into a virtual storage device accessible to a storage consumer. The virtualization software may include a group validation layer comprising a device-independent interface configured to verify that a current configuration of the one or more storage devices is capable of supporting a desired virtualization function.

Figure 1:
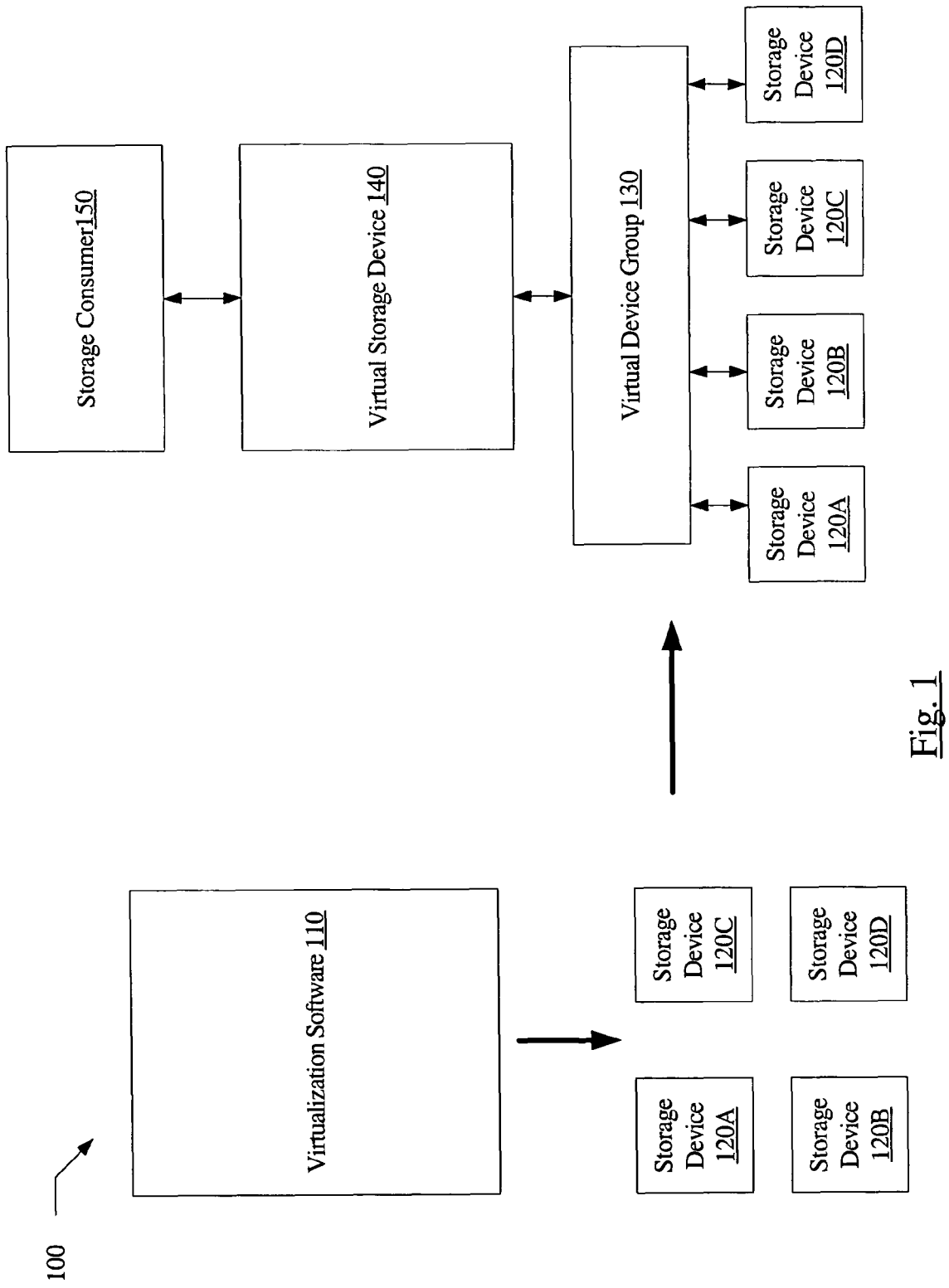
FIG. 1 is a block diagram of one embodiment of a system including virtualization software and a set of storage devices managed as a virtual device group, where storage in the set of storage devices is aggregated as a virtual storage device accessible to a storage consumer.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a system 100 including virtualization software 110 and a set of storage devices 120A-D (collectively referred to herein as storage devices 120). Virtualization software 110 is configured to manage storage devices 120 as a virtual device group 130, to aggregate storage in storage devices 120 into a virtual storage device 140, and to make virtual storage device 140 accessible to a storage consumer 150.

A typical storage environment may store large amounts of data (e.g., terabytes of data) on a variety of storage devices 120, which may be centrally located or distributed throughout an enterprise. Such storage devices may be heterogeneous in nature, including many different types of devices with varying functional and performance specifications from many different manufacturers. A technique called virtualization may be employed within some storage environments to aggregate one or more such storage devices into one or more virtual devices 140 that have better characteristics than the underlying storage devices. Enhanced capabilities provided by virtual device 140 may include, for example, increased bandwidth, decreased access latency, higher availability, flexible configuration and administration, and automated backup and restore. Virtual device 140 may hide details of the implementation (for example, the details of the manner in which data is laid out on a physical storage device) of the underlying storage device from a storage consumer, thereby allowing storage consumers to use simple interfaces (such as "read X blocks at offset Y on the virtual storage device" or "write N bytes at offset P within file F") to perform desired operations on the virtualized storage. Virtualization software 110 may present virtualized storage device 140 to storage consumers 150 using a variety of virtualization primitives in different embodiments, such as virtual blocks or virtual objects such as files, as described in more detail below. In organizing storage devices 120 into virtual device 140, virtualization software 110 may form a virtual device group 130 in order to operate on storage devices 120 as a unit. As also described below in further detail, operating on a virtual device group 130 instead of on individual storage devices 120A-D may support easier implementation of enhanced virtualization functionality in some embodiments, such as flexible allocation of storage, the ability to import storage previously used by a different virtual device, and the ability to manage frozen images (also known as snapshots or point-in-time copies) of data stored in virtual device 140. Virtualization software 110 may be referred to herein as a virtual device group manager.

In one embodiment, storage devices 120 may include physical storage devices, such as disks; while in other embodiments, a storage device 120 may itself be a virtual storage device, allowing for multiple layers of virtualization in system 100. A more detailed description of embodiments including multiple layers of virtualization is provided below.

In some embodiments, storage consumer 150 may represent an application (such as a database management system, a file system, or a frozen image server) that may require access to storage within virtual storage device 140 for data storage and retrieval. In other embodiments, storage consumer 150 may itself be an instance of virtualization software that uses virtual device 140 as a constituent of a higher-level virtual storage device.

Figure 2:
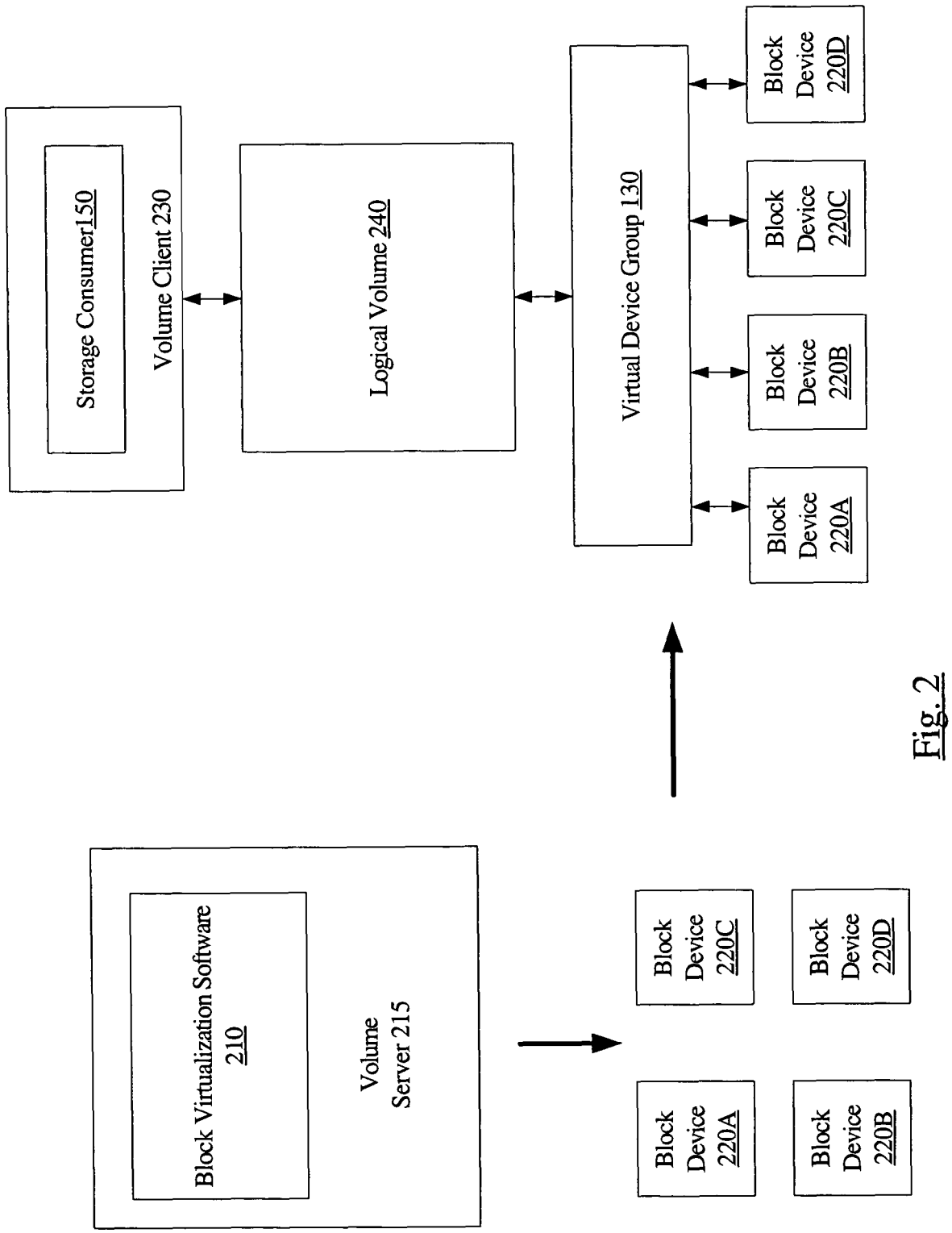
FIG. 2 is a block diagram illustrating an embodiment of the system shown in FIG. 1 employing block-based virtualization.

As stated above, virtualization software 110 may provide different virtualization primitives, such as virtual blocks or virtual objects, to storage consumers. (Object-based virtualization is described in greater detail below.) FIG. 2 illustrates an embodiment of system 100 employing block-based virtualization (also referred to herein as block virtualization). In FIG. 2, block devices 220 (i.e., block devices 220A-D) correspond to storage devices 120 of FIG. 1, where a block device 220 may comprise a hardware or software entity that provides a collection of linearly addressed data blocks that can be read or written. For example, in one embodiment a block device 220 may be a single disk drive configured to present all of its sectors as an indexed array of blocks. It is contemplated that any suitable type of storage device may be configured as a block device 220, such as fixed or removable magnetic media drives (e.g., hard drives, floppy or Zip-based drives), writable or read-only optical media drives (e.g., CD or DVD), tape drives, solid-state mass storage devices, or any other type of storage device. Block virtualization software 210 may implement the general functionality described above for virtualization software 110, e.g., it may manage block devices 220 as a virtual device group 130, aggregate storage within block devices 220, provide additional virtualization functionality, and present the aggregated storage to storage consumer 150 as a collection of linearly addressed data blocks. In some embodiments of block virtualization, a block device 220 may also be a logical or virtual block storage device resulting from a mapping of blocks of one or more physical storage devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device 220 may differ from a file in that it may not require use of a file system for access; that is, a consumer of a block device 220 may read or write blocks directly to the device, bypassing any file system that may be in use. In some embodiments, a block device presented by an operating system for use by a consumer may present relatively few primitives through which the device may be manipulated. For example, in one embodiment a block device may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices that are physical storage devices, such as disks or tape drives, may be configured to present some form of SCSI interface, though other interfaces are possible and contemplated.

In a block virtualization environment, storage within block devices 220 may be aggregated to form a virtual storage device known as a volume or a logical volume (240). Generally speaking, a volume 240 may comprise a block device that may be presented directly for use by a block device consumer, i.e., storage consumer 150. In some embodiments, storage consumer 150 may be a file system or an application (such as a database application, for example) that can directly use block devices. As described in greater detail below, in some embodiments employing block virtualization, a given volume 240 may be associated with several logical or physical block devices. In such embodiments, each block device included in the logical organization of a given volume or virtualized block device may be referred to as a storage object or logical storage object.

As stated earlier, physical storage devices, including physical block devices such as disks, may have varying functional and performance specifications, and may be obtained from many different manufacturers for use within a given storage environment. In some embodiments, prior to aggregating storage within physical block devices into one or more volumes, the physical block devices may be configured as a virtual device group 130 for management as a unit with a common configuration. For example, virtualization software included in the VERITAS Volume Manager™ product provided by VERITAS Software Corporation may be used to combine physical disks to form disk groups, which are named collections of disks with a common configuration. A volume formed using this product is created within a disk group (that is, storage for creating a specific volume must be allocated from the disks forming one disk group). A volume formed from a disk group may not span different disk groups, although multiple volumes may share the same disk group. Once a disk group has been created, it provides a convenient administrative interface for volume level operations such as storage allocation (i.e., expanding the total amount of storage within a volume, either by using existing unused disk space within the disk group, or by adding new disks to the disk group), storage deallocation (e.g., by removing a disk from a disk group), deporting storage (making disks within a disk group unavailable for access from a current set of clients, for example, prior to importing the disk group at another client or clients), importing the disk group, etc. In some embodiments, a virtual device group 130 (such as a disk group) may include an internal virtual device (such as a logical block device) that maps each physical storage device managed as part of the virtual device group. Such internal virtual devices may not be accessible directly to storage consumers 150. A virtual device group 130 may also be formed from virtual storage devices in some embodiments. In some embodiments, a virtual device group may be explicitly named, while in other embodiments, a virtual device group may be identified simply by listing its constituent storage devices.

The configuration of a set of storage devices 120 (or 220) as a virtual device group 130 may require each individual device to comply with a set of specifications in order to allow a virtual storage device 140 (or a volume 240) formed from virtual device group 130 to provide the desired virtualization functionality. For example, in one embodiment, hardware snapshot-capable block devices may be used to provide frozen image functionality for a volume 240. Two types of hardware snapshot-capable block devices may be available in such an embodiment: a "source" hardware block device, and a "target" hardware block device. During a frozen image creation operation, source hardware block devices may be usable only for a particular kind of data transfer operation (e.g., reading the data), while target hardware block devices may be usable only for a different kind of data transfer operation (e.g., writing a copy of data read from a source hardware block device). Nevertheless, it may be possible to combine both source and target hardware block devices as part of a single virtual device group underlying a logical volume 240—that is, the interfaces available to configure the two kinds of hardware devices may allow their combination within a single virtual device group. If source and target hardware block devices are inadvertently combined within a virtual device group 130 intended to be used as for a logical volume 240 that is a destination of a frozen image operation, and an attempt to create a frozen image onto the destination logical volume is later made without verifying that the hardware block devices are appropriately configured (i.e., that the destination virtual device group comprises only target hardware devices), data corruption may result. In addition, because of the presence of both types of hardware block devices within the destination virtual device group, configuration metadata for the target logical volume or frozen image may also be corrupted. Further details concerning the use of a virtual device group 130 in a manner that avoids such data and/or metadata corruption, and the interactions between virtualization software 110 (or 210) and virtual device groups 130, are provided below.

A volume 240 may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume 240 implementing various block virtualization features may be directly accessible by a consumer without the issues presented by such disk drivers.

In an environment employing block virtualization, block virtualization software 210 may be executable at a volume server 215, which may also be referred to as a volume coordinator or as a virtualization coordinator. A volume server 215 may be any device capable of executing block virtualization software 210, such as a server computer system, including one or more processors and one or more system memories. Further, storage consumer 150 may be hosted within a volume client 230, which may be any type of device capable of interacting with a given volume 240 for data storage and retrieval.

For example, in one embodiment a volume client may also be a server computer system, where the server system is configured to execute software such as one or more operating systems and/or applications. In another embodiment, a volume client may be a client computer system configured to access a given volume via a separate server computer system.

In executing block virtualization software 210, a volume server 215 may create some number of virtualized block devices out of one or more physical or logical block devices. (In some embodiments, physical storage devices such as intelligent disk arrays and virtualization switches, described in more detail in conjunction with the descriptions of FIG. 9 and FIG. 10 below, may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a storage consumer 150, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of block virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or frozen image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

A volume server 215 may provide functions such as configuration management of virtualized block devices and distributed coordination of block device virtualization. For example, in one embodiment volume server 215 may be aware of the type and quantity of physical storage devices, such as block devices 220, that are available within a storage system. In various embodiments, the virtualization functions provided by volume server 215 may be provided at different levels in the storage hierarchy between a storage consumer 150 and block devices 220.

For example, in one embodiment, volume clients 230 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 215 may be configured to build a volume description that describes how a collection of storage objects compliant with the desired features maps to underlying physical block devices. The volume description identifying a particular volume 240 may be distributed to one or more volume clients 230. In one embodiment, such a volume description may be a tree of storage objects such as described in greater detail below in conjunction with the description of FIG. 3. Each volume client 230 may be configured to interact with volume server 215 for certain functions, for example management or administrative functions. For typical block read and write activity, each volume client 230 may be configured to interact directly with various block devices 220 according to the volume description distributed by volume server 215.

The structure of the volume 240, for example as indicated by its corresponding storage object tree, may indicate to a given volume client 230 how the volume relates to one or more underlying physical storage devices. In one embodiment, the leaf nodes of such a tree may correspond to one or more physical block devices such as block devices 220, and the root node of such a tree may be a logical block device through which the volume is accessed by a consumer. Distribution of a virtualized block device as a volume to one or more volume clients 230 may also be referred to as distributed block virtualization. In some embodiments, after volume server 215 has distributed a volume description of a given virtual block device to a given volume client 230 as a particular volume 240, the given volume client 230 may interact with that particular volume 240 to read and write blocks without further involvement on the part of volume server 215, as described above. That is, the given volume client 230 may use the structure of the particular volume 240 to transform I/O requests generated by various consumers of that volume 240 into I/O requests directed to specific physical storage devices, such as block devices 220.

In some embodiments, details of block virtualization may not be directly available to individual volume clients 230. In some such embodiments, the virtualization function of volume server 215 may be implemented in a device or layer of abstraction in between volume clients 230 and block devices 220, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 230, as in the host-based model, while some aspects may be implemented transparently by an intermediate device, as in the switch-based model. Further, in some multilayer embodiments, the virtualization details of one block device (e.g., a given volume 240) may be fully defined to a volume client 230 (i.e., without further virtualization at the switch layer), while the virtualization details of another block device (e.g., another volume) may be partially or entirely transparent to volume client 230.

Figure 3:
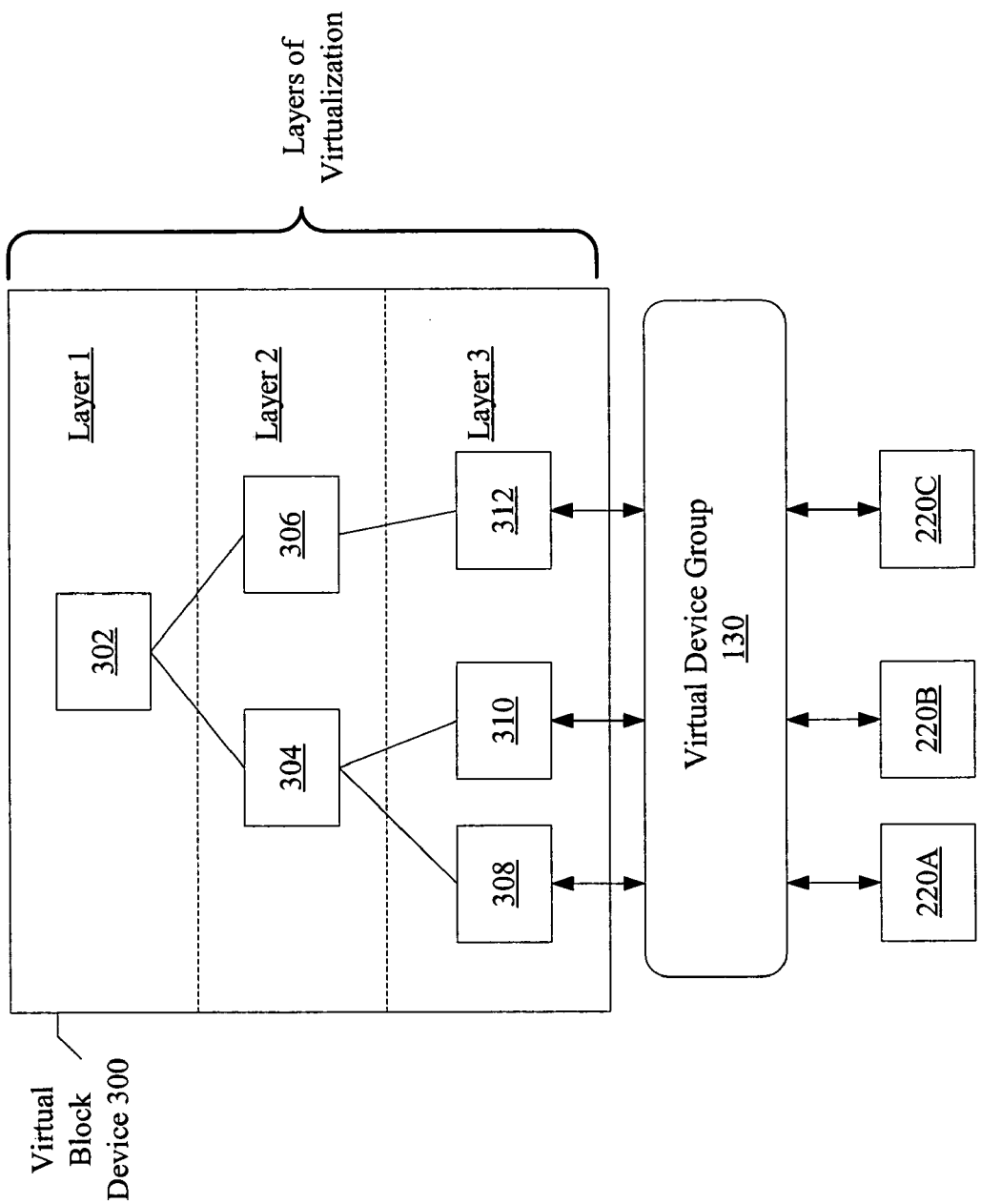
FIG. 3 is a block diagram illustrating one embodiment of a block virtualization device that employs multiple layers of virtualization.

One embodiment of a virtualized block device that may be presented to a volume client 230 as a volume is illustrated in FIG. 3. In the illustrated embodiment, virtualized block device 300 includes a volume block device 302 that includes logical block devices 304 and 306. In turn, logical block device 304 includes logical block devices 308 and 310, while logical block device 306 includes logical block device 312, thus providing three layers of virtualization. Logical devices 308, 310 and 312 use virtual device group 130, which includes physical block devices of 220A-C to of FIG. 2.

Virtualized block device 300 may in its entirety represent the structure of the data comprising a given volume 240, which data may be physically stored in physical block devices 220A-C. Volume block device 302 may be configured to be mounted within a file system or presented to an application or other volume consumer as the interface through which the consumer may interact with given volume 240. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 300 may be configured as a mirrored volume, in which a given data block written to virtualized storage device 300 is duplicated, and each of the multiple copies of the duplicated given data block are stored in respective block devices. In one such embodiment, volume block device 302 may be configured to receive an operation to write a data block from a consumer of corresponding volume 240. Volume block device 302 may duplicate the write operation and issue the write operation to both logical block devices 304 and 306, such that the block is written to both devices. In this context, logical block devices 304 and 306 may be referred to as mirror devices. In various embodiments, volume block device 302 may read a given data block stored in duplicate in logical block devices 304 and 306 by issuing a read operation to one mirror device or the other, for example by alternating devices or defaulting to a particular device. Alternatively, volume block device 302 may issue a read operation to multiple mirror devices and accept results from the fastest responder.

As described above and shown in FIG. 3, in some embodiments a virtualized block device 300 may employ multiple layers of virtualization. For example, in the embodiment described above where logical block devices 304 and 306 function as mirror devices, it may be the case that underlying physical block devices 220A-C have dissimilar performance characteristics; specifically, devices 220A-B may be slower than device 220C.

In order to balance the performance of the mirror devices, in one embodiment, logical block device 304 may be implemented as a striped device in which data is distributed between logical block devices 308 and 310. For example, even- and odd-numbered blocks of logical block device 304 may be mapped to logical block devices 308 and 310 respectively, each of which may be configured to map in turn to all or some portion of physical block devices 220A-B respectively. In such an embodiment, block read/write throughput may be increased over a non-striped configuration, as logical block device 304 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 220C may employ a different block size than logical block device 306. In such an embodiment, logical block device 312 may be configured to translate between the two physical block sizes and to map the logical block space defined by logical block device 306 to the physical block space defined by physical block device 220C. In some instances, the logical block space of logical block device 312 need not be contiguously mapped to blocks of physical block device 220C; an arbitrary mapping may be used.

Numerous other possible configurations of block devices are contemplated that may incorporate more or fewer layers of virtualization to realize within a given instance of virtualized block device 300 virtualization functions similar to or different from those described above. For example, volume block device 302 may employ a greater number of mirror devices, striping may occur higher in the hierarchy than mirroring, certain logical block devices may be configured to perform snapshots of other devices, certain logical block devices may span multiple physical block devices, etc. In another embodiment of a virtualization hierarchy, a set of virtual devices at a given layer of the hierarchy may be organized into a virtual device group, and managed as a unit by a virtual device at a higher layer in the hierarchy.

In one embodiment, volume server 215 may be configured to read and update configuration information corresponding to volume descriptions (such as a storage object tree corresponding to a given volume) from a configuration database (not shown), which may be implemented either within volume server 215 or external to it. The configuration information in the database may establish the logical configuration of data on the physical storage devices 220 (e.g., block devices 220A, 220B, and 220C). For example, such configuration information may indicate how various logical and physical block devices are divided, striped, mirrored, etc. In one embodiment, the configuration information may be stored on the devices (e.g., block devices 220A, 220B, and 220C) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 240 is distributed to more than one volume client 230, any changes that affect the structure of the given volume 240 may need to be coherently coordinated among the relevant volume clients 230. In one embodiment volume server 215 may be configured to coordinate such changes. For example, volume server 215 may be configured to coordinate quiescence of those volume clients 230 to which the given volume 240 is distributed, in order to temporarily suspend activity to given volume 240. Volume server 215 may further distribute changes to the structure of given volume 240 to relevant volume clients 230 in an effectively atomic fashion, such that either all or none of the relevant clients 230 receive the changes.

In some embodiments, volume server 215 may be configured to distribute all defined volumes 240 to each volume client 230 present within a system. Such embodiments may be referred to as symmetric distributed block virtualization systems. In other embodiments, specific volumes 240 may be distributed only to respective volume clients 230, such that at least one volume 240 is not common to two volume clients 230. Such embodiments may be referred to as asymmetric distributed block virtualization systems.

As mentioned earlier, in contrast to block virtualization environments, in some embodiments, object-based virtualization may be employed: that is, virtualization software 110 may be configured to organize storage within storage devices 120 as higher-level logical objects (such as files) instead of using a more traditional block-based interface such as SCSI or IDE. Virtualization software 110 may be executable within an object storage device (OSD) in such an environment. In an object virtualization environment, virtual storage may be named, managed, and made accessible as a virtual device 140 using any desired base object as implemented by virtualization software 110, such as a file object or a database table object. Thus, in one embodiment, storage consumer 150 may be presented with a virtual storage device 140 consisting of a collection of named files, and may perform file-based operations (such as reads from a file, writes to a file, increasing the size of a file, truncating a file, etc.) directly on virtual storage device 140. Object-based virtualization may thus allow the offloading of functionality traditionally performed at a host computer system (such as the translation of a file name and offset within a file to a block device address) to a storage device such as an object storage device that may be optimized to perform the needed storage operations, freeing up resources at the host computers. In addition, once virtual objects have been created and configured, an object storage device may distribute information on the virtual objects in the form of a virtual object-based storage device 140 to storage consumer 150, allowing storage consumer 150 to perform input/output (I/O) operations on the virtual objects without further interaction with the object storage device. Thus, unlike some traditional file server implementations, object storage devices may not become bottlenecks under heavy I/O loads on the managed virtual objects, thus contributing to an overall improvement in system performance. Also, an object storage device may provide storage consumers 150 with transparent access to virtual objects across different operating systems and hardware/software platforms.

As stated earlier, storage devices 120 may be managed collectively as a virtual device group 130 in both block virtualization environments and object virtualization environments. In some embodiments, individual storage devices 120 that constitute a virtual device group 130 may need to meet certain requirements in order to support the virtualization functions provided by one or more virtual devices 140 that utilize the virtual device group. Prior to performing a proposed configuration operation, such as the addition of a new device 120 to a virtual device group 130, it may be desirable to verify that the resultant virtual device group configuration would support the desired virtualization functionality. For example, if a new device is to be added to a virtual device group for the purpose of forming an additional mirror of a mirrored volume containing an existing set of mirrors, it may be desirable to verify that the new device is large enough to store a copy of an existing mirror. In addition, in some storage environments, virtual devices may have associated Quality-Of-Service (QOS) specifications for performance and/or availability. Such QOS specifications may, for example, require the virtual device vendor to guarantee (to within some specified statistical margin of variability) that an I/O operation with specific characteristics (e.g., an operation to read of X bytes) performed on the virtual device will, on the average, complete within a specified period of time. QOS specifications for availability may require, for example, that a hardware storage device underlying the virtual device must have a Mean-Time-Between-Failures (MTBF) value of a specified number of days. In such environments, it may be possible to verify whether a specific storage device is capable of meeting the required QOS specification(s) using an interface specific to the storage device: for example, some hardware storage devices may provide a low-level device-specific interface to query whether the device is equipped with a set of redundant power supply units that may impact MTBF values. Performance data that may be used to verify whether a QOS specification may be met by a specific storage device may also be verifiable using a device-specific interface: e.g., by actually performing some I/O operations on the device and measuring the time taken to complete the operations, or in some cases by querying a storage device for vendor-supplied performance data metrics such as typical and peak random I/O throughput.

As shown in FIG. 3, a hierarchy of virtual devices may be built using a virtual device group, and different layers of a virtualization hierarchy may offer different virtualization features described earlier, such as mirroring, striping, frozen image operations, and the like. As stated earlier, virtual devices at a given layer of the virtualization hierarchy may be managed as a virtual device group by a virtual device at a higher layer. In some embodiments, virtualization features provided at one layer of a virtualization hierarchy may impose certain requirements on other layers of the same hierarchy, or even on a layer of a different hierarchy. For example, in order to accommodate a larger than expected amount of application data, it may be desired to add a new storage device to an existing virtual device group used by a multi-layered source volume (such as volume 302) configured for frozen image creation. If the addition of the new storage device to the source logical volume is not accompanied by a corresponding addition of a second storage device to a virtual device group at a target volume where the frozen image is to be stored, it may not be possible to successfully complete a creation of a frozen image (i.e., not enough storage may be available on the target volume to create a complete frozen image of the source volume). In such an environment, it may be desirable to determine whether a proposed addition of a new storage device may have an adverse impact of the frozen image functionality, prior to expanding the virtual device group at the source volume. Similarly, a removal of a storage device from a virtual device group at the target frozen image volume may also prevent successful frozen image operations, and it may be desirable to verify that such a removal has no adverse consequences prior to removing the device. In another embodiment, one or more copy-on-write (COW) snapshots of a given storage device 120A may be maintained on other storage devices 120B-D at a given layer of a virtualization hierarchy. An inadvertent combination of storage device 120A and devices 120B-D into a single virtual device group (e.g., by a higher layer of the virtualization hierarchy) may lead to potential data loss or metadata corruption during a subsequent operation on the group, such as a use of the newly formed virtual device group as a snapshot target for a different snapshot source.

A complex storage environment may include hundreds or thousands of physical and virtual storage devices from different storage vendors arranged in numerous storage hierarchies, with different virtualization functions and QOS levels provided by different virtual devices. Each storage vendor may provide a different vendor-specific interface to configure and/or query each kind of storage device: for example, a different interface may be provided for a disk array provided by a specific vendor than the interface provided by the same vendor for a single disk. In such an environment, it may be desired to simplify storage environment administration by using one (or a small number) of virtualization software products to manage the entire collection of storage, and it may also be desired to automate as much of storage configuration as possible. For example, a large database management system may be used in such a complex storage environment, and it may be a goal to allow the database management system to "automatically" grow the amount of virtual storage used for its tables, indexes, logs etc. over time. The database management system may rely upon one or more layers of virtualization software 110 in order to accomplish this goal, which may require the automation of virtual device group enlargement (i.e., automatic discovery and addition of new storage devices to an existing virtual device group). In order to reduce complexity and increase maintainability of virtualization software 110, a device independent layer of virtualization software may be developed to help manage the organization of storage devices as virtual device groups, as shown in FIG. 4.

Figure 4:
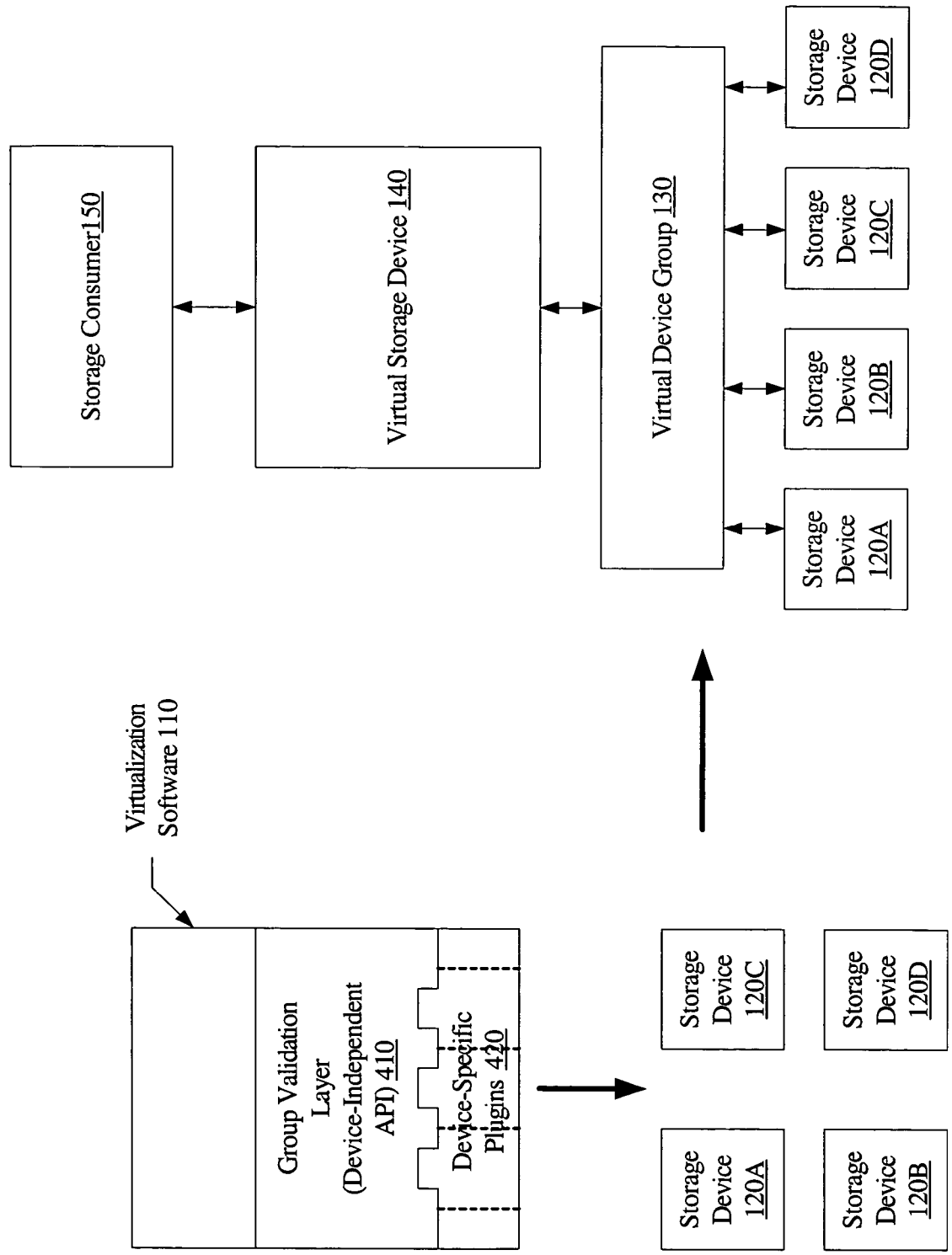
FIG. 4 is a block diagram illustrating an embodiment of the system of FIG. 1 where the virtualization software includes a group validation layer comprising a device-independent application programming interface (API).

FIG. 4 illustrates an embodiment of system 100 where virtualization software 110 includes a group validation layer comprising a device-independent application programming interface (API) 410. Device-independent API 410 may provide clients (including other layers of virtualization software 110, as well as other applications) with a set of function calls, methods, or other interface mechanisms to validate a proposed configuration operation on devices 120 and virtual device group 130. That is, device-independent API 410 may be used to verify that a proposed configuration operation would, if completed, result in a configuration capable of supporting desired virtualization functionality provided by virtual storage device 140. If the proposed configuration operation is validated, virtualization software 110 may perform the configuration operation, for example, as part of an automated operation or in response to input from a system administrator. If the proposed configuration operation is found to result in an invalid configuration, an error message may be logged in a log file or displayed in response to a command issued by a system administrator, and virtualization software 110 may be prevented from performing the proposed configuration operation.

In different embodiments, device-independent API 410 may be provided using one or more programming languages (such as C, C++, or Java), a scripting language (such as Perl, Tcl/Tk, Python, C-Shell, Korn Shell, or Bourne Shell), some other language suitable for interaction with virtualization software 110 and other client applications, or a combination of such languages. The execution of functions or methods from device-independent API 410 may result in the invocation of device-specific software modules provided as device-specific plugins 420, which implement the interfaces of API 410 and communicate directly with storage devices 120. Device-specific plugins 420 implementing the functionality required by device-independent API 410 may be provided by storage device 120 vendors in some embodiments, while in other embodiments they may be developed by vendors providing virtualization software 110.

In some embodiments, device-independent API 410 may also be exposed to and used by applications (such as storage consumer 150) other than virtualization software 110. For example, a database management system may be configured to automatically expand storage as needed to accommodate growing data, and may use device-independent API 410 to verify that the addition of a specific storage device 120 to a virtual device group 130 would result in a valid configuration prior to expanding virtual device group 130.

Device-independent API 410 may include numerous functions, methods, or other interfaces that may be invoked to validate different virtual device group configuration operations in different embodiments. Each method or function may have an associated parameter indicative of the virtualization functions that need to be supported by the virtual device group and may be affected by the configuration operation; for example, such a parameter might indicate that the virtual device group may need to support a frozen image creation capability. Depending on the configuration operation whose validity is being checked, a function, method or interface of device-independent API 410 may also have associated parameters specifying the virtual device group 130, one or more storage devices 120 that may participate in the proposed configuration operation, and other parameters specific to the specific configuration operation. A function or method may also be provided to revalidate an existing configuration; for example, such a revalidation function may be used after a power outage and subsequent restart to verify that an existing virtual device group still meets a specified set of requirements.

In one embodiment, for example, group validation layer 410 may include the following device-independent interfaces, each of which is described in more detail below:

VerifyAddToGroup(virtualizationFlags, deviceId, groupId)

VerifyRemoveFromGroup(virtualizationFlags, deviceId, groupId)

VerifyExistingConfiguration(virtualizationFlags, groupId)

VerifyChangeDeviceConfiguration (virtualizationFlags, deviceId, groupId, configuration Change)

VerifyGroupDeportable(virtualizationFlags, groupId)

VerifyGroupImportable(virtualizationFlags, groupId)

VerifyGroupImportableAtLocation (virtualizationFlags, groupId, storageAddress)

VerifyGroupDestroyable(virtualizationFlags, groupId)

In each of the interfaces listed above, the virtualizationFlags parameter may be used to encode information regarding the specific virtualization functions (e.g., frozen image creation, import/export, virtual RAID-5 functionality, etc.) and/or QOS requirements to be implemented by virtual storage device 140. In some embodiments, a virtualizationFlags parameter or its equivalent may also be used to encode other information such as whether virtualization functionality is being implemented by a host-based volume manager, an intelligent disk array, a virtualization switch, or an object storage device, and to identify the client software (e.g., an application such as a database management system) invoking the function or method. A groupId parameter included in each interface may identify a virtual device group upon which a proposed configuration operation (or a configuration revalidation) may be performed. Virtual device group identification may also be implemented in some embodiments using an array or list explicitly enumerating the existing storage devices constituting the virtual device group instead of using a single identifier such as groupId. A deviceId parameter may be used in several of the listed interfaces to identify a specific storage device 120 involved in the proposed configuration operation. In one embodiment, the invocation of any of the listed interfaces may result in a coded result value being returned to the invoking entity (such as an application or a layer of virtualization software 110), where the result value may represent either a successful validation, or an error code indicating that the proposed configuration operation may result in an invalid configuration. In some embodiments, an error code returned by a function or method implementing an interface may encode not just an identification of a potential error, but also a potential corrective action or actions that may need to be taken by the invoking entity to avoid the potential error. An example of such an error encoding is provided below.

Figure 5:
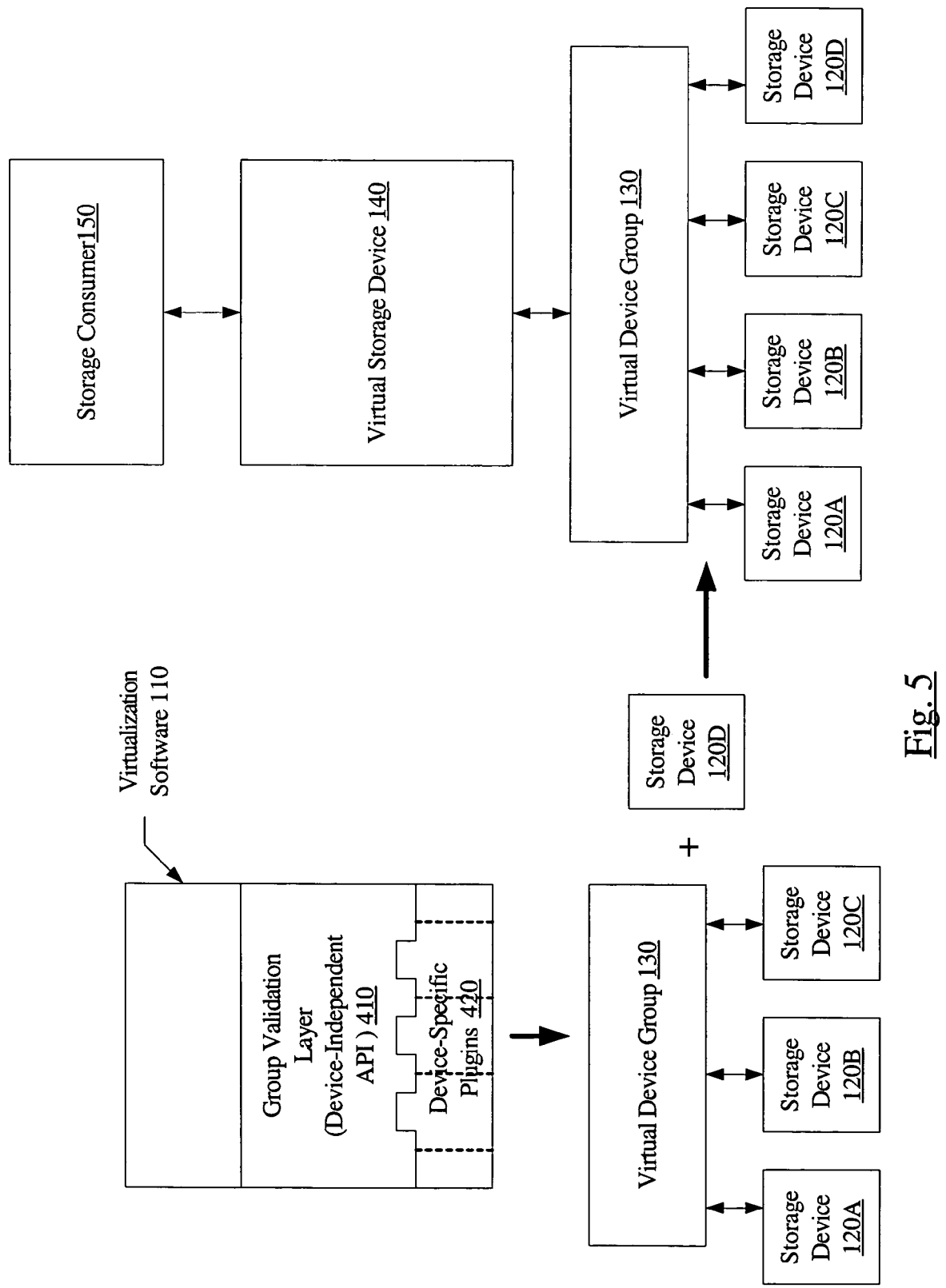
FIG. 5 is a block diagram illustrating the use of a device-independent interface to validate a proposed addition of a storage device to a virtual device group for one embodiment.

As illustrated in FIG. 5 for one specific embodiment, a VerifyAddToGroup( ) interface may be used to validate a proposed addition of a storage device 120D to a virtual device group 130. Virtual device group 130 may include storage devices 120A-C prior to the proposed addition, as shown in the illustrated embodiment. In other embodiments, virtual device group 130 may be empty prior to the proposed addition; that is, the proposed configuration operation may be the initial formation of a virtual device group 130 including a single storage device 120. As described earlier, various characteristics of virtual device group 130, device 120D, and virtual storage device 140 may be taken into account when validating the proposed addition of a device to a virtual device group. For example, in some embodiments, QOS requirements associated with virtual storage device 140 may affect the validity of the proposed addition operation. In other embodiments, virtual device group 130 may be constrained to include only storage devices 120 that conform to a specific version of a storage management standard specification or a communication protocol specification. In embodiments supporting frozen image operations using hardware source and target snapshot-capable storage devices, a VerifyAddToGroup( ) interface may be used to prevent the inadvertent mingling of source and target devices within a virtual device group 130. Similarly, in an embodiment where copy-on-write (COW) snapshots of device 120A may be maintained on devices 120B-D, as described earlier, a VerifyAddToGroup( ) interface may also be used to prevent a combination of devices 120B-D with device 120A within a single virtual device group. As stated above, an error code returned by a method or function implementing the VerifyAddToGroup( ) interface may identify the source of a potential invalid configuration and provide suggested corrective actions: e.g., the error code returned may be translatable to an error message such as "Configuration Invalid: Attempt to add incompatible hardware snapshot target device to virtual device group consisting of hardware snapshot sources; retry using a hardware snapshot source device".

Figure 6:
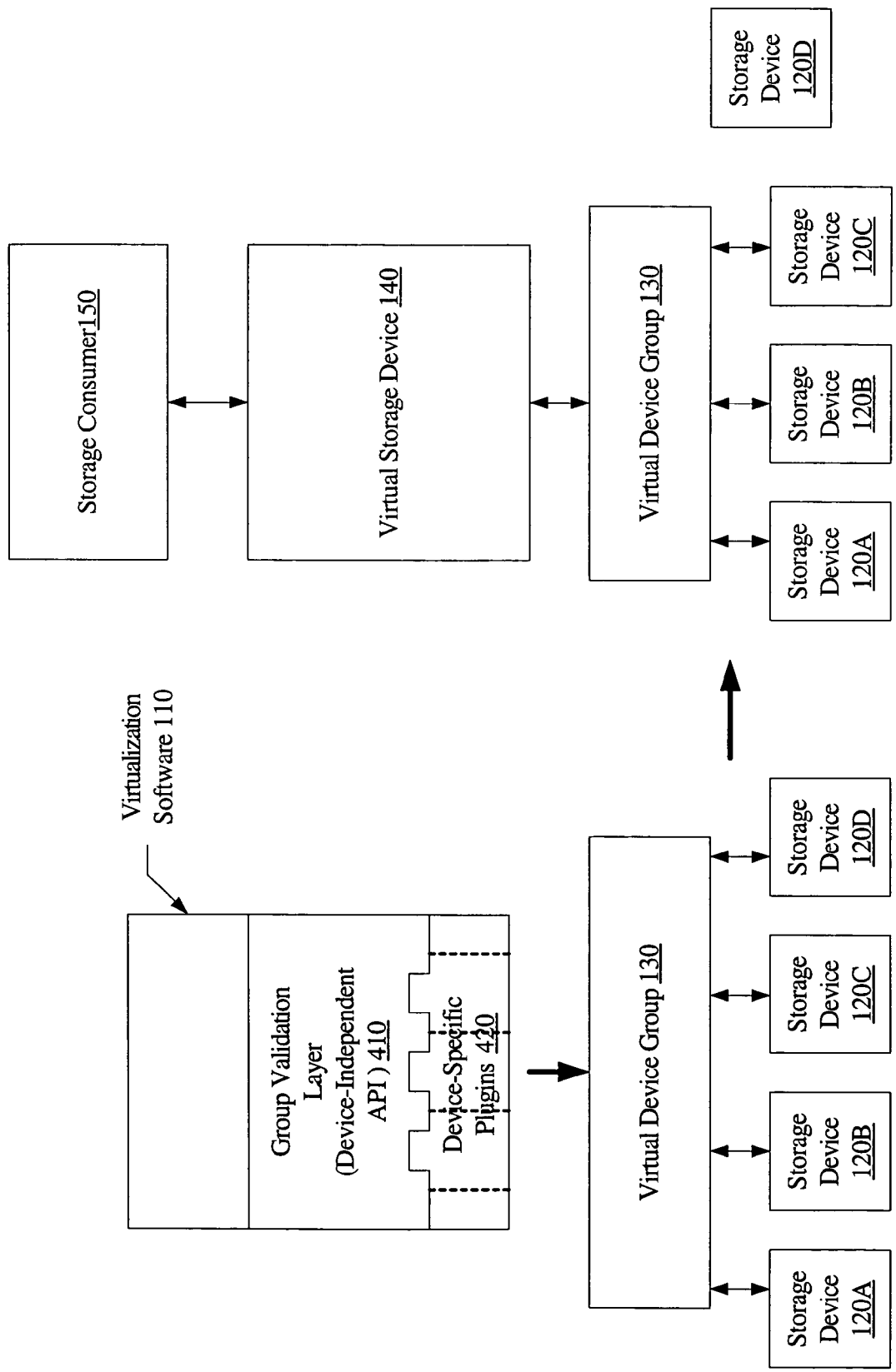
FIG. 6 is a block diagram illustrating the use of a device-independent interface to validate a proposed removal of a storage device from a virtual device group for one embodiment.

FIG. 6 illustrates the use of a VerifyRemoveFromGroup( ) interface to validate a removal of storage device 120D from virtual device group 130 in one embodiment. Just as QOS requirements may affect the validity of an addition of a device 120 to a virtual device group 130 as described above, QOS requirements associated with virtual storage device 140 may also affect the validity of a removal of device 120D from virtual device group 120. In some embodiments, for example, the availability or performance of virtual storage device 140 may be affected by a removal of storage device 120D (for example, if storage device 120D provided mirroring functionality, in which case both availability and performance may be affected by the removal). Virtualization functionality such as frozen image capabilities supported by virtual storage device 140 may also be affected by a removal of storage device 120D in some embodiments. For example, if virtual storage device 140 is a target volume where a frozen image of another source volume is to be stored, a removal of device 120D may result in a failure of a subsequent frozen image creation operation due to a lack of sufficient space. In such an embodiment, a call to a function implementing VerifyRemoveFromGroup( ) may result in an error message indicating an invalid proposed configuration operation.

As described previously, a device-independent interface of API 410 may also be used to revalidate an existing configuration, for example subsequent to a power outage followed by a restart of a set of hosts and storage devices. Interface VerifyExistingConfiguration( ) may be used to accomplish this functionality. In some embodiments employing a hierarchy of virtualization such as storage device 300 of FIG. 3, a function or method implementing the VerifyExistingConfiguration( ) interface may also be used to traverse the virtualization hierarchy to verify whether the hierarchy is correctly configured for one or more virtualization operations such as a frozen image operation. In some embodiments, the virtualization hierarchy may already be organized as virtual device groups prior to a traversal, e.g., the storage devices at each layer of the hierarchy may be organized as one or more virtual device groups accessible to a storage device at a higher layer. In other embodiments, in traversing the virtualization hierarchy for configuration verification, each virtual storage device (such as 302) that is built upon a set of lower-level virtual storage devices (e.g., 304 and 306) may form a temporary or permanent virtual device group out of the set of constituent lower-level devices. Thus, when traversing the hierarchy of FIG. 3, a first invocation of VerifyExistingConfiguration( ) may be used to verify that devices 304 and 306 form a valid virtual device group to support the virtualization features provided by device 302. A second invocation of VerifyExistingConfiguration( ) may be used to verify that devices 308 and 310 form a valid virtual device group to support the virtualization features supported by device 304, and so on. In some embodiments, such a traversal of a virtualization hierarchy may be performed using software (e.g., a configuration verification tool) that is configured to retain the results of the configuration verification for each storage device in the hierarchy, and to combine the results for all the storage devices in the hierarchy into a single report. Such a combined report for a complex virtualization hierarchy may in some cases provide a system administrator with an indication of a suboptimal hierarchy. For example, a higher level of a virtual hierarchy may be configured as a virtual RAID-5 array, while a lower level of the hierarchy may utilize devices implementing RAID-5 in hardware. Thus, duplicated virtualization functionality may be detected using multiple invocations of VerifyExistingConfiguration( ) in a traversal of a virtualization hierarchy, allowing a system administrator or an automated administration tool to reorganize the virtual hierarchy more optimally.

The VerifyChangeDeviceConfiguration( ) interface may be used to validate a proposed change to the configuration of a particular device 120 within a virtual device group 130. The VerifyChangeDeviceConfiguration( ) may include a configurationChange parameter identifying the specific type of configuration change proposed on a storage device. For example, a proposed configuration change may modify the size or internal organization of a cache of a specific storage device 120, or may make part or all of a storage device 120 read-only, i.e., future writes may be disallowed to the storage device. Such changes at a particular storage device 120 may also affect the ability of virtual storage device 140 to provide desired virtualization functionality, even if all other storage devices 120 remain unchanged.

Figure 7:
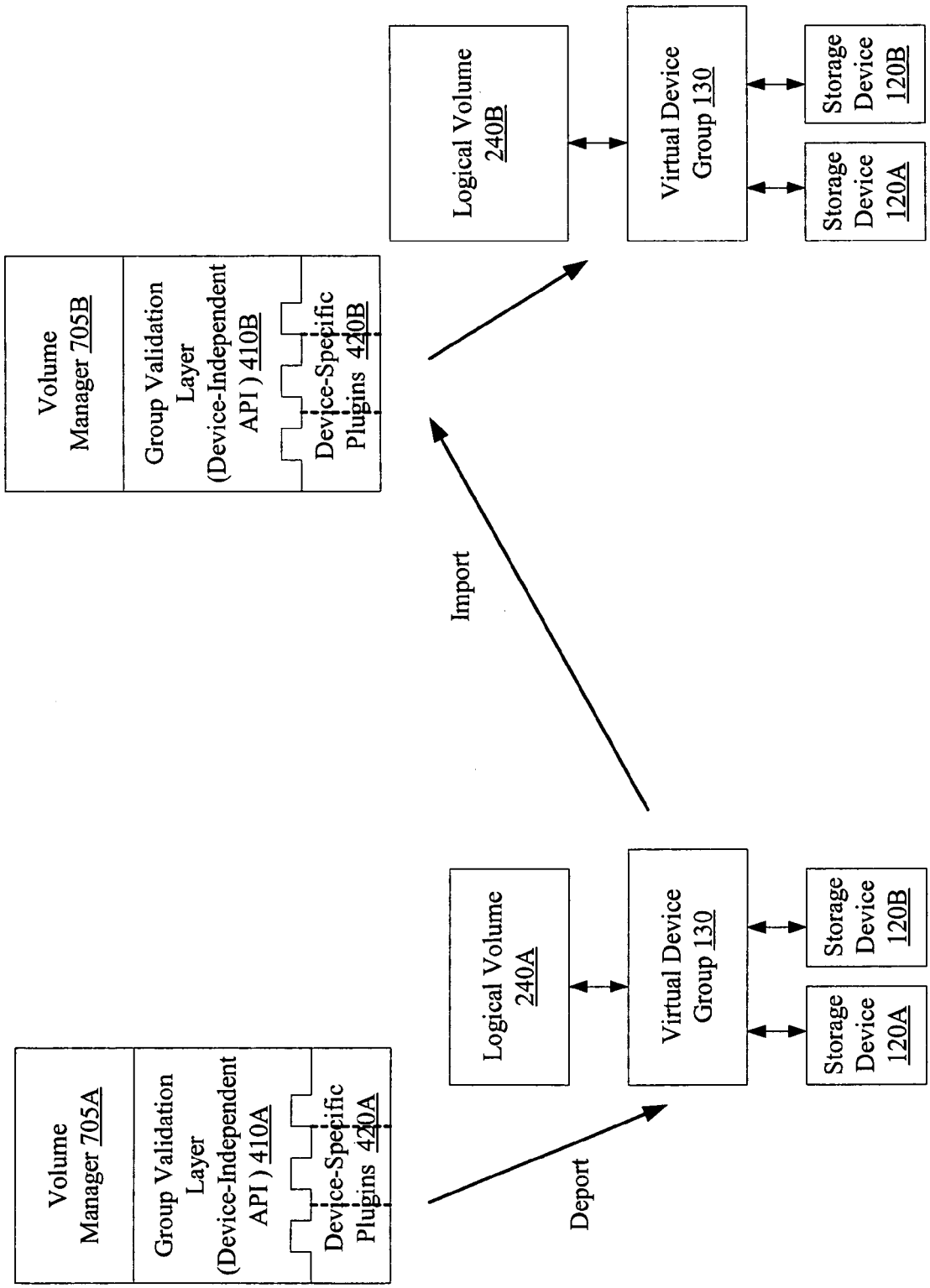
FIG. 7 is a block diagram illustrating the use of a device-independent interface to validate proposed deport and import operations on a virtual device group for one embodiment.

FIG. 7 illustrates the deportation of virtual device group 130 from a volume manager 705A managing logical volume 240A and its subsequent importation at volume manager 705B for use within logical volume 240B in one embodiment. The VerifyGroupDeportable( ) interface may be used to validate whether virtual device group 130 can be deported from a volume manager 705A, and the VerifyGroupImportable( ) interface may be used to verify that virtual device group 130 is configured correctly to be imported at volume manager 705B. As used herein, the term "to deport from" means "disabling access to the clients of". A virtual device group may be deported from a volume manager or any other virtual device group manager such as an object storage device that provides virtualization of storage contained in the storage devices constituting the virtual device group. If a specific storage device 120A from a virtual device group 130 is configured as part of a target volume of a frozen image operation, for example, virtual device group 130 may not be deportable even if all other storage devices 120 within the group may be available for deportation. A virtual device group 130 may not be importable by a volume manager 705B due to a variety of reasons, such as a mismatch between the virtualization features intended to be supported at volume 710B 240B by importing volume manager 705B and the features supported by the devices 120 within virtual device group 130.

The VerifyGroupImportableAtLocation( ) interface may be used in a storage environment where techniques such as zoning and/or LUN masking may be used to restrict access from various hosts to specific storage devices. A storage address (such as a world-wide-name or WWN) may be associated with each host in such an environment. Prior to importing a virtual device group at a target host with a specific storage address (specified by a storageAddress parameter), the VerifyGroupImportableAtLocation( ) interface may be used to verify that devices within the specified virtual device group are visible at the target host.

The VerifyGroupDestroyable( ) interface may be used to verify that a virtual device group 130 may be disassembled (i.e., whether its constituent storage devices 120 may be distributed for use either individually or as part of other virtual device groups) without impacting virtualization functionality currently being provided.

It is noted that the set of interfaces listed above may be extended and modified in various ways in different embodiments to provide the desired functionality. For example, the VerifyAddToGroup( ) and VerifyRemoveFromGroup( ) interfaces may be extended to include the verification of the addition or removal of a set of storage devices 120 rather than a single storage device (e.g., by including an array parameter deviceIdArray[ ] instead of the single deviceId parameter described above). One or more interface parameters may not be used in some embodiments—for example, the virtualizationFlags parameter may not be used in a storage environment where the virtualization features supported are implicit.

Functionality similar to that provided by the interfaces described above for one embodiment may be provided by using a different device-independent API 410, for example using a different convention for specifying interfaces and parameters in another embodiment. Interfaces providing additional functionality for verification of proposed changes to virtual device group configurations and/or existing virtual device group configurations, beyond the functionality listed above, may be used in some embodiments. For example, additional interfaces may be added to restrict access to one or more storage devices or virtual device groups, or to set or verify attributes of a virtual device group. One or more attributes could be used to identify a virtual device group as appropriate for a failover in a clustered environment, as being shared across nodes of a cluster, or as being capable of being used as part of a snapshot operation. In other embodiments, device independent API 410 may not provide some of the functionality described for the listed interfaces.

Virtualization software 110 and device-independent API 410 may be used to provide the functionality described above in a variety of different configurations of system 100. In one embodiment, storage devices 120 may all be attached to a single computer host. Virtualization software 110 may be configured to execute on the same computer host, and virtual storage device 140 may be made accessible to a storage consumer 150 utilizing the same computer host. In another embodiment, various components of system 100 may be distributed among the nodes of a cluster, as illustrated in FIG. 8.

Figure 8:
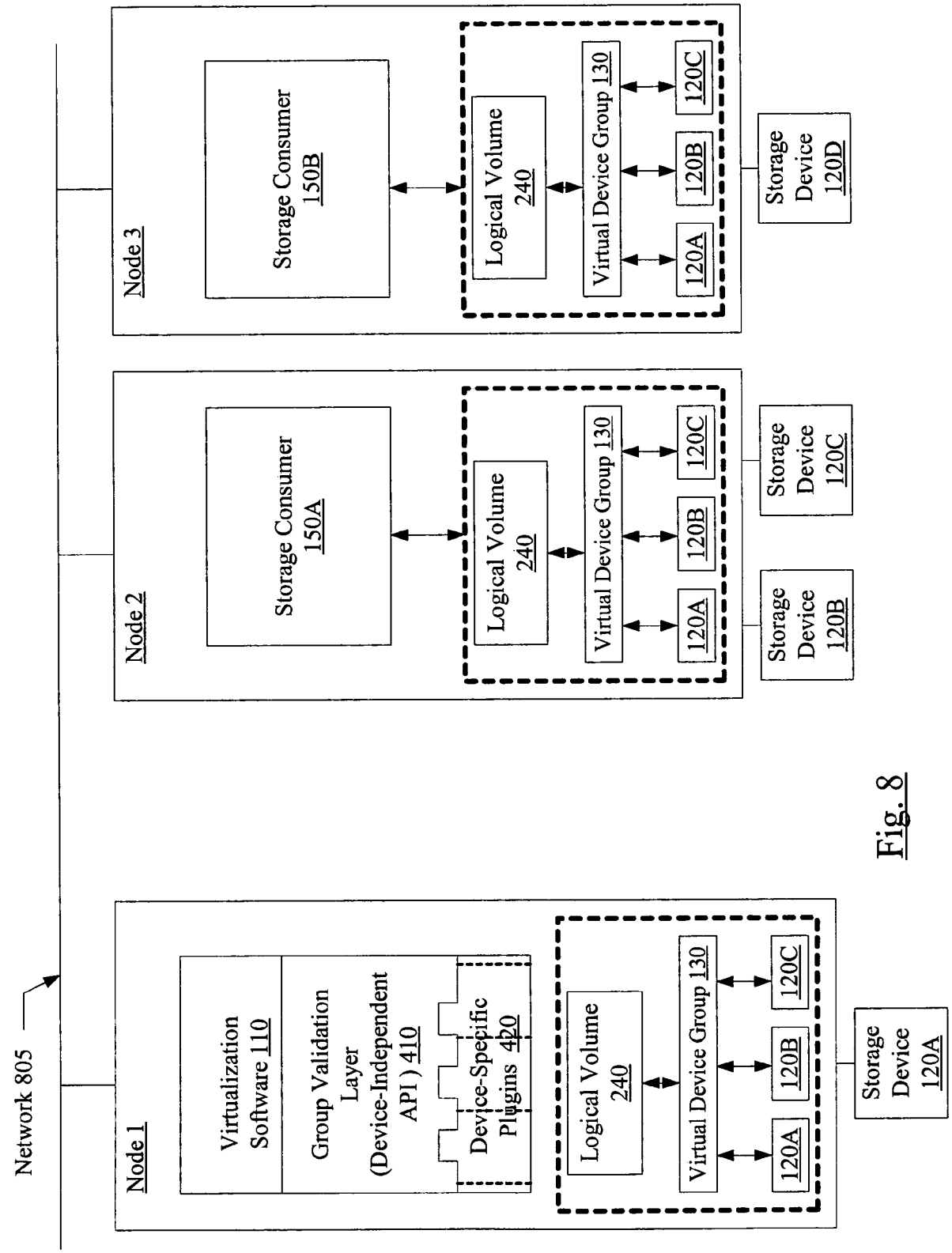
FIG. 8 is a block diagram illustrating an embodiment where components of the system of FIG. 1 are distributed among the nodes of a cluster.

In the embodiment illustrated in FIG. 8, three nodes forming a cluster may be coupled to a network 805. Storage device 120A may be attached to Node 1, storage devices 120B and 120C may be attached to Node 2, and storage device 120D may be attached to Node 3. Virtualization software 110 may be executable on Node 1. Device-independent API 410 may be used by virtualization software 110 to manage storage devices 120A-C as a virtual device group 130. Storage within devices 120A-C may be aggregated into logical volume 240 by virtualization software 110, and may be made accessible to storage consumers 150A on Node 2 and 150B on Node 3. As illustrated, the storage devices 120 constituting virtual device group 130 may each be attached to one node of the cluster, while the virtual device group 130 and a virtual storage device such as volume 240 utilizing virtual device group 130 may be accessible from multiple nodes. A node such as Node 3 may have a storage device 120D attached to it that does not form part of any virtual device group, while an application executing on the node (such as storage consumer 150B) may have access to virtual device group 130 formed from storage devices 120A-C that are not attached to the node. In another embodiment, a virtual device group may also be formed using storage devices that are shared across multiple nodes of a cluster. In general, device-independent API 410 may be executable at any suitable node of a cluster, and it may be used to validate configuration operations on storage devices and virtual device groups that may be distributed in arbitrary configurations across the nodes of a cluster. In addition, configuration software 110 may make virtual device groups and virtual storage devices using the virtual device groups accessible from any combination of nodes in a cluster.

Virtualization software 110 may be incorporated within different platforms in different embodiments. In one embodiment, virtualization software 110 may form part of a volume manager that provides virtualization using system software running on host computers. In other embodiments, part or all of virtualization software 110 may also be provided by migrating some virtualization functions from host computers into one or more separate entities such as an intelligent disk array as depicted in FIG. 9, a virtualization switch as depicted in FIG. 10, or an object storage device (OSD) as depicted in FIG. 11.

Figure 9:
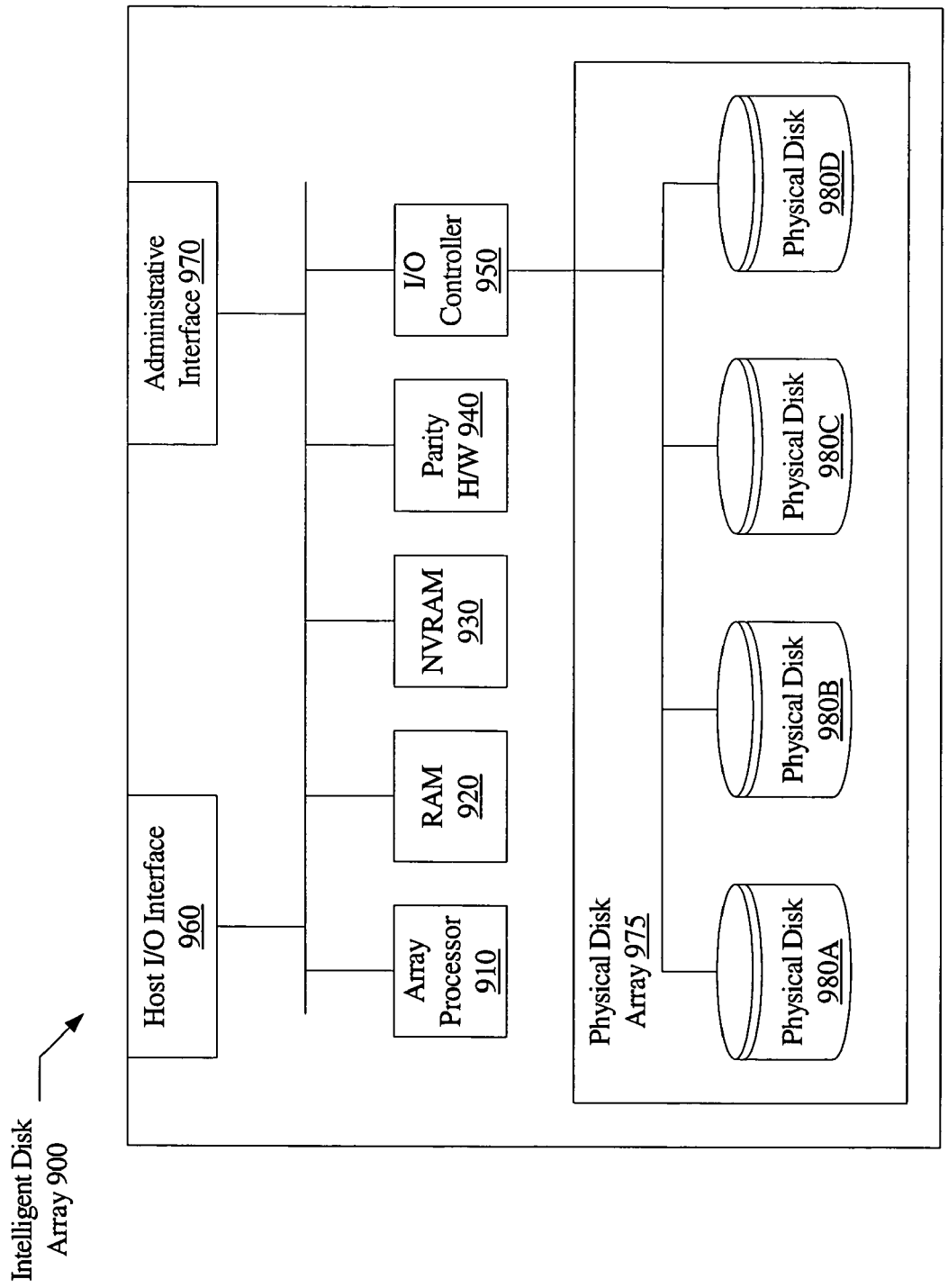
FIG. 9 is a block diagram illustrating an embodiment where the virtualization software of FIG. 1 is executable in an intelligent disk array.

FIG. 9 is a block diagram illustrating one embodiment of an intelligent disk array 900 incorporating virtualization software 110. Array 900 may provide virtualization for a physical disk array 975 including physical disks 980A-980D. Several interfaces may be provided to users of intelligent disk array 900: for example, a host I/O interface 960 may allow computer hosts to perform I/O operations, and an administrative interface 970 may allow system administrators to configure an intelligent disk array 900. Intelligent disk array 900 may also include other components such as one or more RAM memories 920 (in which instructions comprising virtualization software 110 may be stored for execution by array processor 910), a non-volatile RAM (NVRAM) 930 to support write-behind caching, special parity hardware 940 for doing computations required for some high-availability disk array architectures, and one or more I/O controllers 950 to connect to physical disk array 975. An I/O request from a host computer, received through host I/O interface 960, may be translated by array processor 910 into one or more I/O requests to disks 980A-D. Intelligent disk array 900 may be configured to provide high availability (using redundant copies of data on several physical devices, for example) and/or high performance (for example, by using disk striping to distribute I/O load across several physical disks), as desired. A volume manager may, in some embodiments, provide a logical volume using one or more intelligent disk arrays 900 as the underlying storage devices.

Intelligent disk array 900 may represent an example of a block server appliance, where specialized hardware may be used to provide virtualization functionality, as described above. Block server appliances may also be provided in some embodiments using block server appliance software running on off-the-shelf computers and commodity disks, rather than using vendor-proprietary hardware and software. For example, the intelligent disk array functions described above may be implemented by specialized software running on a general-purpose computer.

Figure 10:
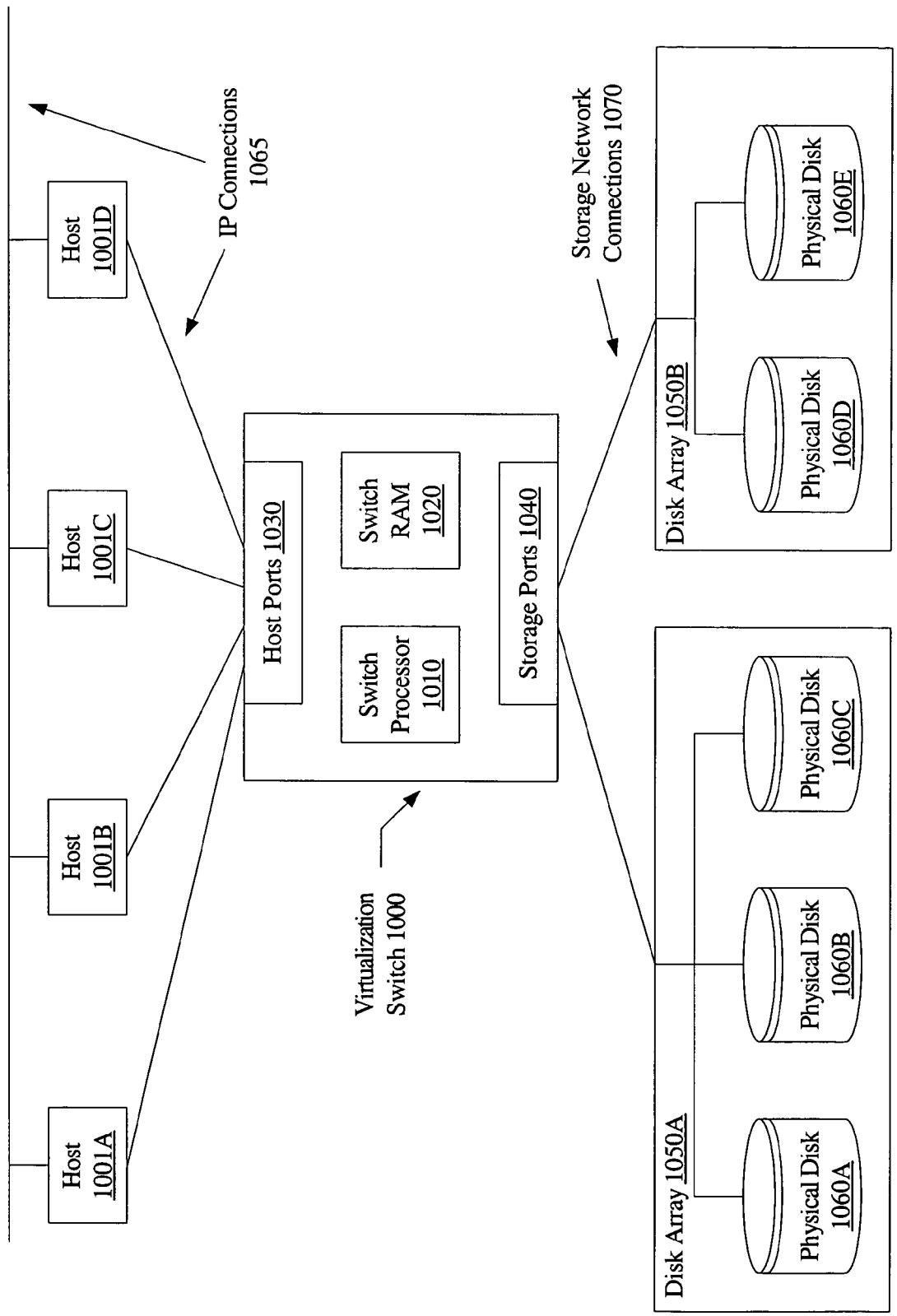
FIG. 10 is a block diagram illustrating an embodiment where the virtualization software of FIG. 1 is executable in a virtualization switch.
Figure 11:
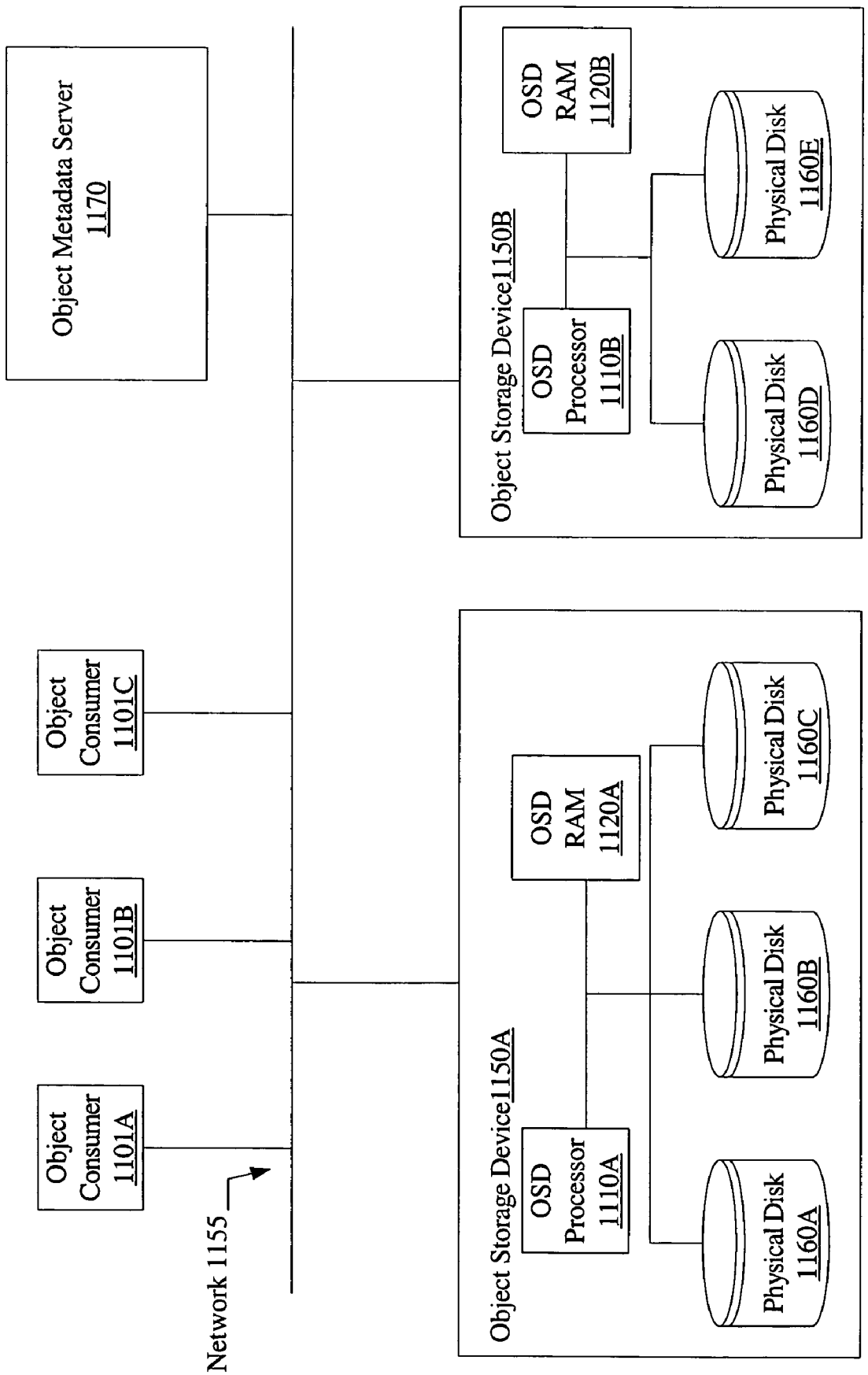
FIG. 11 is a block diagram illustrating an embodiment where the virtualization software of FIG. 1 is executable in two object storage devices.

Another method of providing virtualization, using a virtualization switch, is illustrated in FIG. 10 for one embodiment. Virtualization switch 1000 may be connected to a number of computer hosts 1001A-D through a number of host ports 1030, and to a number of different storage devices such as disk arrays 1050A and 1050B containing physical disks 1060A-E. The physical disks contained within a particular disk array 1050 may be managed collectively as a virtual device group 130. In the illustrated embodiment, hosts 1001 may communicate with virtualization switch 1000 via host ports 1030 using the Internet Protocol (IP). Virtualization switch 1000 may be configured to communicate with different storage devices (such as disk arrays 1050) through a number of storage ports 1040 using different storage network protocols: for example, it may communicate with disk array 1050A using a fiber-channel connection, and with another disk array 1050B using an iSCSI connection. In the embodiment shown, an I/O request from an application running on a host 1001 may be converted to one or more SCSI commands and/or data encapsulated within one or more IP packets and sent to virtualization switch 1000. Switch processor 1010 and switch memory (RAM) 1020 may be used to execute and store virtualization software 110, respectively. Switch processor 1010 and switch memory 1020 may also be used to collect and recombine the contents of the IP packets and translate them into one or more I/O requests to one or more disk arrays 1050. Disk arrays 1050A and 1050B may, in some embodiments, be intelligent disk arrays providing the same general functionality as described above for FIG. 9. The use of IP may allow the use of geographically distributed networks (e.g., Metropolitan Area Networks or MANs, Wide Area Networks or WANs, and/or the Internet) for connections between computer hosts 1001 and storage devices using virtualization switch 1000. In some embodiments, virtualization switches may provide logical volume functionality to hosts 1001, while in others embodiments, a logical volume may be provided by a volume manager running on a host 1001, using virtual storage devices provided by a virtualization switch 1000.

FIG. 11 is a block diagram illustrating an embodiment of a storage virtualization system that conforms generally to the system illustrated in FIG. 1, where object-based virtualization is implemented using object storage devices (OSD) 1150A and 1150B. Each OSD 1150 includes a corresponding OSD processor 1110, where virtualization software 110 may be executed, and an OSD RAM 1120 where virtualization software 110 may be stored. In the embodiment illustrated, ODS 1150A includes a collection of physical disks 1160A-C, and OSD 1150B includes physical disks 1160D-E. Each OSD may manage its physical disks as a virtual device group 130. Metadata for objects stored in disks 1160 (including, for example, naming information and security tokens) may be presented to object consumers 1101 by object metadata server 1170. Having been provided the required metadata, object consumers may perform I/O operations on objects presented by object metadata server 1170 using direct communications over network 1155 to OSDs 1150. An OSD 1150 may translate an incoming I/O request into one or more low-level (e.g., block-based) I/O operations on one or more physical disks 1160 managed by the OSD 1150.

It is noted that various combinations of the different virtualization techniques described above may be employed within different embodiments of system 100. For example, in one embodiment, a single storage environment may employ host-based volume managers, intelligent disk arrays, virtualization switches, object storage devices, and other virtualization mechanisms, some of which may be combined to provide a hierarchy of virtual storage devices configured to provide different kinds of virtualization functionality. Device-independent API 410 may be usable in managing a variety of storage devices as virtual device groups within such a storage environment. It is also noted that the use of device-independent API 410 is not limited to the specific virtualization techniques described herein; rather, device-independent API 410 may be used in any virtualization environment where storage devices are managed as virtual device groups. It is also noted that membership requirements for virtual device groups may vary in different embodiments and for different virtualization functions. In some embodiments, for example, the requirements may be fairly restrictive (e.g., that all disks within an intelligent disk array are provided by the same manufacturer and have the same part number), while in other environments, the requirements may be less restrictive (e.g., that all disks within a storage array have a redundant power supply unit).

In different embodiments, virtualization software 110 may be provided to a computer system using a variety of computer-readable storage media including electronic storage media (e.g., flash memory), magnetic storage media such as RAM (e.g., SDRAM, RDRAM, SRAM, etc.), optical storage media such as CD-ROM, etc. In various embodiments, virtualization software 110 may be provided to a computer system using transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more storage devices;
at least one processor; and
a memory coupled to the at least one processor;
wherein the memory stores virtualization software executable by the at least one processor to aggregate storage in the one or more storage devices as a virtual storage device accessible to a storage consumer;
wherein the virtualization software comprises a group validation layer executable by the at least one processor to determine whether a proposed group configuration operation on the one or more storage devices is valid, wherein said group validation layer comprises a device-independent interface to allow an application to manage the one or more storage devices as a virtual device group;
wherein, in determining whether the proposed group configuration operation on the one or more storage devices is valid, the group validation layer is executable by the at least one processor, prior to performing the proposed group configuration operation, to:
    verify that the proposed group configuration operation allows the virtual storage device to support one or more desired virtualization functions; and
    verify that the proposed group configuration operation allows the virtual storage device to meet a quality-of-service requirement.

2. The system as recited in claim 1, wherein the proposed group configuration operation is an operation to add a storage device to the virtual device group.

3. The system as recited in claim 1, wherein the proposed group configuration operation is an operation to remove a storage device of the one or more storage devices from the virtual device group.

4. The system as recited in claim 1, wherein the proposed group configuration operations is an operation to disallow further access to the virtual device group from a virtual device group manager.

5. The system as recited in claim 1, wherein the proposed group configuration operation is an operation to import the virtual device group at a virtual device group manager.

6. The system as recited in claim 1, wherein the proposed group configuration operation is an operation to make the virtual device group unavailable by removing all storage devices contained in the virtual device group from the virtual device group.

7. The system as recited in claim 1, wherein the proposed group configuration operation is a frozen image operation.

8. The system as recited in claim 1, wherein the virtualization software is a volume manager.

9. The system as recited in claim 1, wherein the application is a database management system.

10. The system as recited in claim 1, wherein the virtualization software is incorporated within an intelligent disk array.

11. The system as recited in claim 1, wherein the virtualization software is incorporated within a virtualization switch.

12. The system as recited in claim 1, wherein the virtualization software is incorporated within an object storage device.

13. The system as recited in claim 1, further comprising a plurality of nodes coupled to a network, wherein the virtual device group is accessible from a first and a second node of the plurality of nodes.

14. The system as recited in claim 1, further comprising a plurality of nodes coupled to a network, where a first subset of the one or more storage devices is attached to a first node of the plurality of nodes, and a second subset of the one or more storage devices is attached to a second node of the plurality of nodes.

15. The system as recited in claim 14, wherein the virtual device group is accessible from the first and second node.

16. The system as recited in claim 14, wherein the virtual device group is accessible from a third node of the plurality of nodes.

17. A method comprising:
    storing data in one or more storage devices;
    aggregating storage in the one or more storage devices as a virtual storage device accessible by a storage consumer;
    using a device-independent interface to determine whether a proposed group configuration operation on a virtual device group comprising the one or more storage devices is valid, comprising, prior to performing the proposed group configuration operation:
        determining whether the proposed group configuration operation allows the virtual storage device to support one or more desired virtualization functions; and
        determining whether the proposed group configuration operation allows the virtual storage device to meet a quality-of-service requirement associated with the virtual storage device.

18. The method as recited in claim 17, wherein the proposed group configuration operation is an operation to add a storage device to the virtual device group.

19. The method as recited in claim 17, wherein the proposed group configuration operation is an operation to remove a storage device of the one or more storage devices from the virtual device group.

20. The method as recited in claim 17, wherein the proposed group configuration operation is a frozen image operation.

21. A non-transitory computer-readable storage medium comprising program instructions, wherein the program instructions are computer-executable to:
    store data in one or more storage devices;
    aggregate storage in the one or more storage devices as a virtual storage device accessible by a storage consumer;
    use a device-independent interface to determine whether a proposed group configuration operation on a virtual device group comprising the one or more storage devices is valid, comprising, prior to performing the proposed group configuration operation:
        determining whether the proposed group configuration operation allows the virtual storage device to support one or more desired virtualization functions; and
        determining whether the proposed group configuration operation allows the virtual storage device to meet a quality-of-service requirement associated with the virtual storage device.

22. The non-transitory computer-readable storage medium as recited in claim 21, wherein the proposed group configuration operation is an operation to add a storage device to the virtual device group.

23. The non-transitory computer-readable storage medium as recited in claim 21, wherein the proposed group configuration operation is an operation to remove a storage device of the one or more storage devices from the virtual device group.

24. The non-transitory computer-readable storage medium as recited in claim 21, wherein the proposed group configuration operation is a frozen image operation.

* * * * *